(12) United States Patent
Park

(10) Patent No.: US 7,270,526 B2
(45) Date of Patent: Sep. 18, 2007

(54) MAIN MOUTH OF BRICK MOLDING MACHINE

(76) Inventor: Jeong-Seon Park, 66-1 Ssangdong1-ri Chowol-myeon, Gwangiu-si, Gyeonggi-do (KR)

( * ) Notice: Subject to any disclaimer, the term of this patent is extended or adjusted under 35 U.S.C. 154(b) by 311 days.

(21) Appl. No.: 11/124,125

(22) Filed: May 9, 2005

(65) Prior Publication Data

US 2006/0251756 A1 Nov. 9, 2006

(51) Int. Cl.
*B22F 3/00* (2006.01)
(52) U.S. Cl. ............... 425/168; 425/110; 425/119; 425/129.2; 425/451.7; 222/151.1; 222/153.14
(58) Field of Classification Search ............... 425/78, 425/168, 80.1, 110, 117, 119, 129.1, 129.2, 425/451.7; 222/151.1, 206, 153.14
See application file for complete search history.

(56) References Cited

U.S. PATENT DOCUMENTS

| | | | |
|---|---|---|---|
| 6,450,754 B1 * | 9/2002 | Catton | 222/185.1 |
| 6,698,624 B2 * | 3/2004 | Ufheil et al. | 222/153.14 |
| 6,889,874 B2 * | 5/2005 | Vohwinkel | 222/201 |
| 6,969,244 B2 * | 11/2005 | Kuniyoshi et al. | 425/143 |

* cited by examiner

Primary Examiner—Yogendra N. Gupta
Assistant Examiner—Thu Khanh T. Nguyen
(74) Attorney, Agent, or Firm—Birch, Stewart, Kolasch & Birch, LLP

(57) ABSTRACT

A main mouth of a brick molding machine is disclosed. In a main mouth installed between a pressing unit of a brick molding machine and a mold in an assembled structure, the main mouth of a brick molding machine comprises a bolt insertion hole that passes through two opposing sides among upper and lower sides and left and right sides between inlet and outlet parts of a mouth body; a resistance member that includes an attaching surface attached to an inner surface of the mouth body having the bolt insertion hole therein, and a resistance surface protruded in a direction of an inner surface of the mouth body; a nut member embedded in the attaching surface of the resistance member with a part of the same being exposed; and an engaging bolt that is inserted from an outer side of the mouth body through the bolt insertion hole and thread-engaged with the nut member embedded in the resistance member for thereby fixing the resistance member to an inner surface of the mouth body.

5 Claims, 10 Drawing Sheets

MAIN MOUTH OF BRICK MOLDING MACHINE

BACKGROUND OF THE INVENTION

1. Field of the Invention

The present invention relates to a main mouth of a brick molding machine capable of press-molding a product such as a brick, a sidewalk brick, a tile, etc. using cay or porcelain clay.

2. Description of the Background Art

Generally, a product such as a stacking brick, a sidewalk brick, etc. has been fabricated in a fabrication process in which a certain material such as clay or the like press-molded using a brick molding machine is cut into a certain size and processed in a firing furnace. The conventional brick molding machine includes a main mouth installed between a pressing unit for pushing a certain material with a strong pressure and a mold.

In addition, the main mouth is fabricated using a special steel having a certain strength that has a lower wearing degree with respect to a friction with clay or porcelain clay, for example, a Hi-Cr special steel.

FIGS. 9 and 10 are views illustrating a structure of a conventional main mouth.

As shown in FIG. 9, an inlet part 310 of a main mouth 300 is thread-engaged with a mounting flange 200 mounted at a front end of a pressing unit 100 of a brick molding machine using a bolt. A mold 400 is engaged at an outlet part 320 of the main mouth. A liner 410 made of special steel is engaged at an inner surface of the mold 400.

The inlet part 310 of the main mouth 300 has a circular inner surface at its cross section like a circular inner surface of the pressing unit 100 of a brick molding machine. The inner diameter of the same is getting smaller and smaller in the direction of the outlet part 320. Namely, an inner surface of the main mouth 300 has an inner diameter that is getting smaller and smaller in the direction of the outlet part 320 at the inlet part 310.

The material discharged through the pressing unit 100 of the brick molding machine has a certain friction resistance and compression force at its outer surfaces contacting with an inner surface that has a certain inner diameter getting smaller and smaller at the time when the material is moved into the inlet part 310 of the main mouth 300, so that its moving speed gets smaller. However, the moving speed at the center portions of the material gets higher and higher as compared at the outer sides of the same. The front sides of a pressing material press-molded by the mold 400 after passing through the outlet part 320 of the main mouth 300 are pressed with a protrusion as shown in FIG. 9. The above phenomenon occurs due to a certain stress by a transfer pressure at the center portion of the pressing material 500. The stress being applied to the center portion of the pressing material 500 is generated at the time when the pressing material 500 is cut into a certain size and is inputted into a firing furnace, so that a product 500 has a certain problem that a bent portion is formed as shown by an imaginary line of FIG. 9.

In order to prevent the above problems of the product 500, as shown in FIG. 10, a resistance protrusion 330 protruded in a streamline shape at an inner surface of the main mouth 300 is integrally formed at both opposite upper and lower sides (left and right sides) or is integrally formed at all sides of the same for thereby preventing the stress at the center of the pressing material 500, so that it is possible to fabricate a good quality of product that is not bent after a firing process.

However, the above conventional art has the following problems.

Since the resistance protrusion 330 is formed at an inner surface of the main mouth 300, a lot of friction occurs with materials, so that the resistance protrusion 330 is fast worn out. When the resistance protrusion 330 is worn out a lot, it is impossible to exchange only the resistance protrusion 330. Namely, it is needed to exchange the entire structure of the main mouth 300. Therefore, the life span of the main mouth is significantly decreased. In addition, since the main mouth 300 is made of special steel, the cost is too expensive. A lot of cost is needed in order to exchange the main mouth for increasing economical load. The above economical load directly affects the fabrication unit cost of the product resulting in a fabrication price of the product.

In the conventional art, the pressing operation of material moving into the mold 400 is enhanced using a certain unit capable of supplying oil (light oil, etc.) through an oil block 600 in which a plurality of oil inlet holes 610 are formed between the outlet part 320 of the main mouth 300 and the mold 500 in order to enhance the fluidity of the material when a certain material having high viscosity is adapted to fabricate the product. However, the above oil block 600 is formed in a single structure. When the oil block is made of special steel, the fabrication cost is too high. When the oil bock 600 is made of a metallic material, not special steel, the abrasion ratio is increased, so that the life span of the oil block is decreased. In addition, since oil is supplied only through the oil inlet holes 610 formed at multiple portions (mainly, four portions) of the oil block 600, a lot of oil should be supplied to each oil inlet hole 610 in order to uniformly apply oil onto an outer surface of the pressing material 500. In this case, oil consumption amount is increased. When a lot of oil is on an outer surface of the pressing material 500, the drying time of the product 510 is extended, so that energy consumption is increased, and the productivity by unit time is decreased.

SUMMARY OF THE INVENTION

Accordingly, it is an object of the present invention to overcome the above-described problems encountered in the conventional art.

It is another object of the present invention to provide a main mouth of a brick molding machine capable of significantly extending the life span of a main mouth in such a manner that a resistance member is made separately from a main mouth with the resistance member being formed at an inner surface of the main mouth of the brick molding machine, and being made in order to provide a certain resistance during a transfer of material, and being detachably engaged at an inner surface of the main mouth, so that when the resistance member is worn out, only the worn resistance member can be exchanged.

It is further another object of the present invention to provide a main mouth of a brick molding machine capable of minimizing a defective product by adjusting an installation position of a resistance member based on the material of the same when installing the resistance member at an inner surface of the main mouth.

It is still further object of the present invention to provide a main mouth of a brick molding machine capable of decreasing a fabrication cost as compared when the whole body of oil block is made of special steel in such a manner that an inner block is made of special block, and an outer block is made of a common metallic material by separating the oil block into inner and outer blocks in an assembled structure, and capable of decreasing the cost required when exchanging the oil block wherein the outer block can be semi-permanently used while only the inner block is exchanged when the inner block made of special steel is worn out.

To achieve the above objects, in a main mouth installed between a pressing unit of a brick molding machine and a mold in an assembled structure, there is provided a main mouth of a brick molding machine, comprising a bolt insertion hole that passes through two opposing sides among upper and lower sides and left and right sides between inlet and outlet parts of a mouth body; a resistance member that includes an attaching surface attached to an inner surface of the mouth body having the bolt insertion hole therein, and a resistance surface protruded in a direction of an inner surface of the mouth body; a nut member embedded in the attaching surface of the resistance member with a part of the same being exposed; and an engaging bolt that is inserted from an outer side of the mouth body through the bolt insertion hole and thread-engaged with the nut member embedded in the resistance member for thereby fixing the resistance member to an inner surface of the mouth body.

An engaging groove is formed at an inner circumferential surface of the bolt insertion hole formed at the mouth body, and an end of the nut member embedded in the resistance member is protruded from the attaching surface, and when the resistance member is assembled to an inner side of the mouth body, the resistance member is thread-engaged with an engaging bolt in a state that the protruded end of the nut member is inserted into the engaging groove.

The bolt insertion hole formed at the mouth body has a narrow width determined so that the engaging bolt passes through the same, and the engaging bolt is thread-engaged with the nut member of the resistance member, moving in a direction of the center, and has an elongated hole having a certain long length in a direction of the inlet part and the outlet part.

An oil block is installed between the pressing unit of the brick molding machine and the mouth body with the oil block being divided into inner and outer blocks.

The mouth body is engaged in an assembled type in a state that the inlet and outlet parts are separately fabricated, so that the resistance member is installed at the outlet part in an assembled type.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
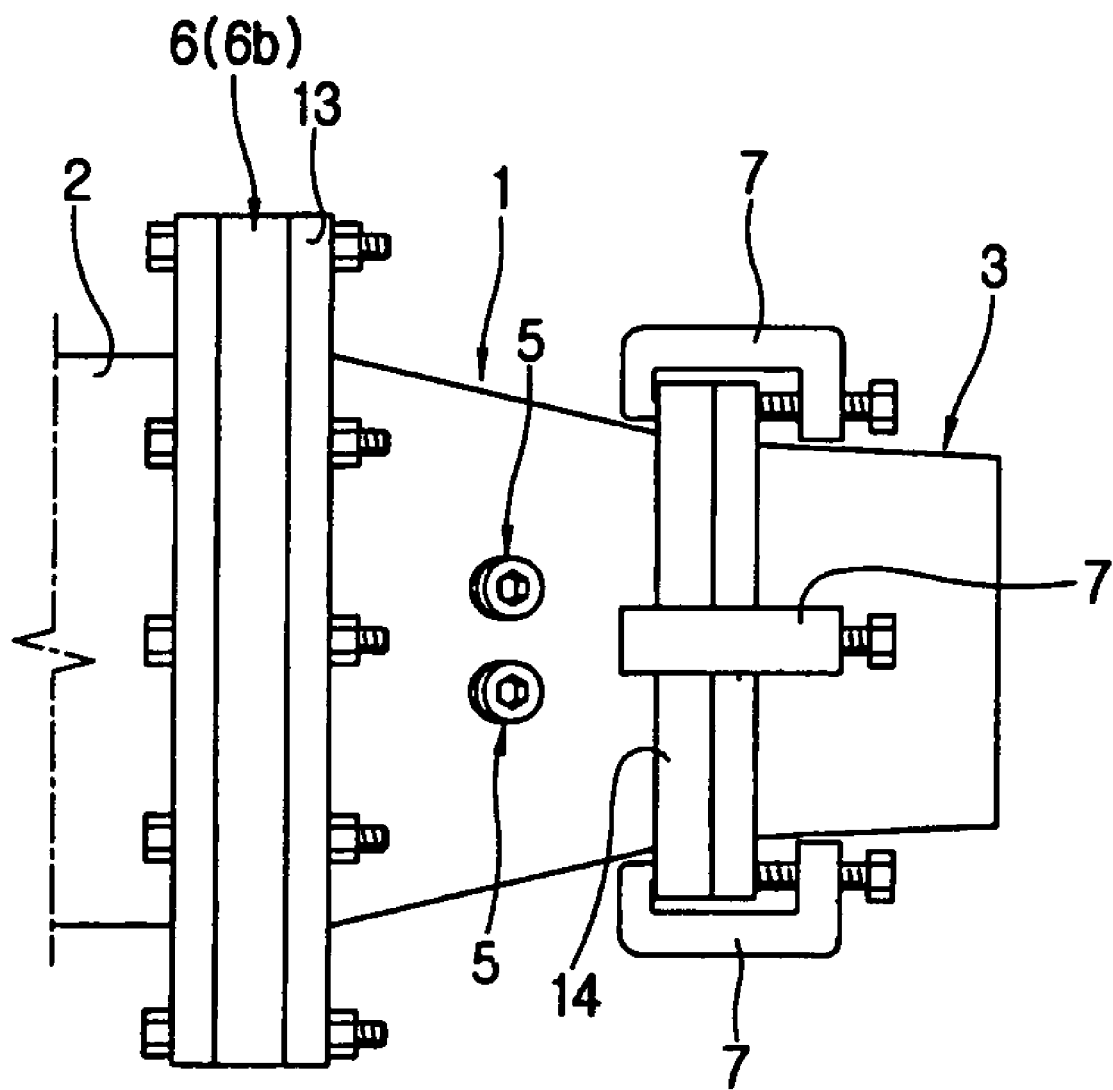
FIG. 1 is a plan view illustrating a main mouth of a brick molding machine according to an embodiment of the present invention.
Figure 2:
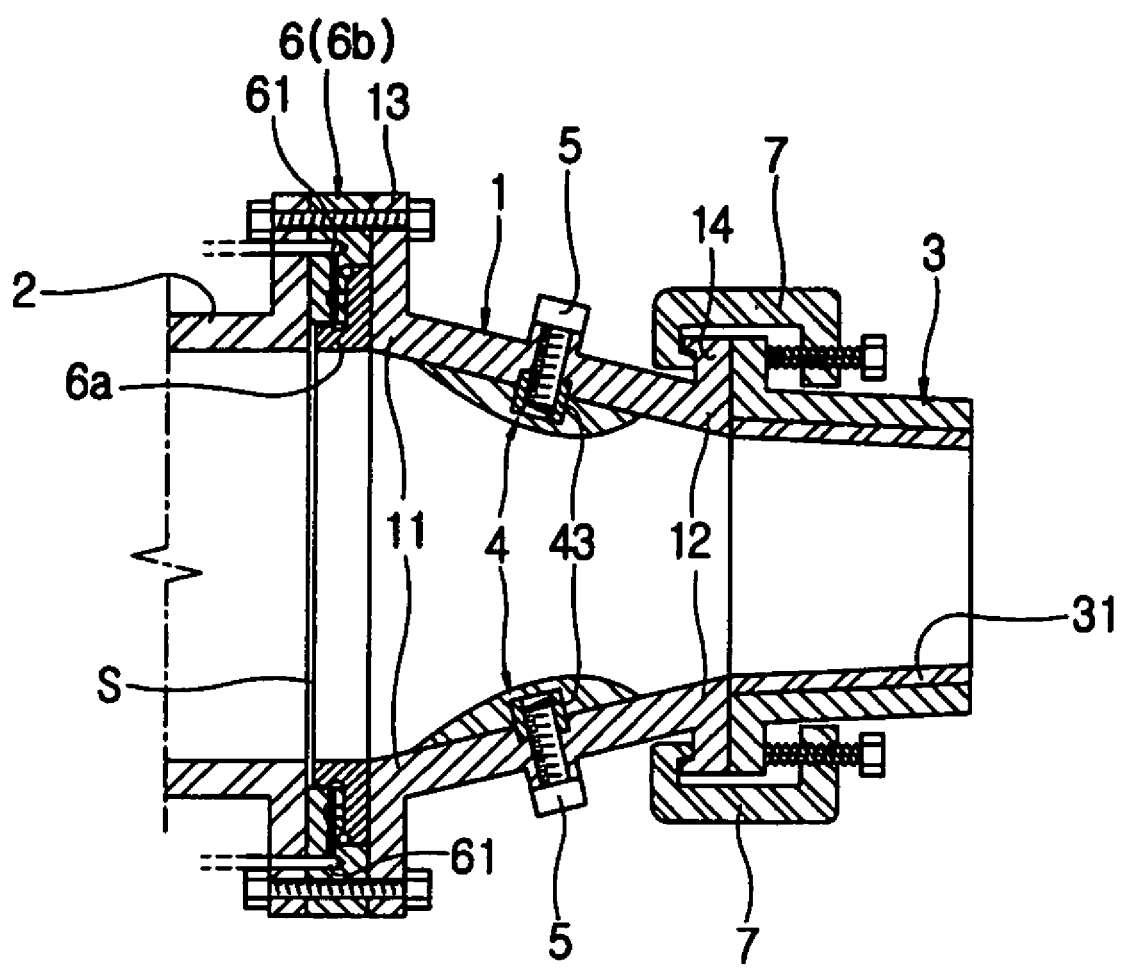
FIG. 2 is a cross sectional view of the embodiment of FIG. 1.
Figure 3:
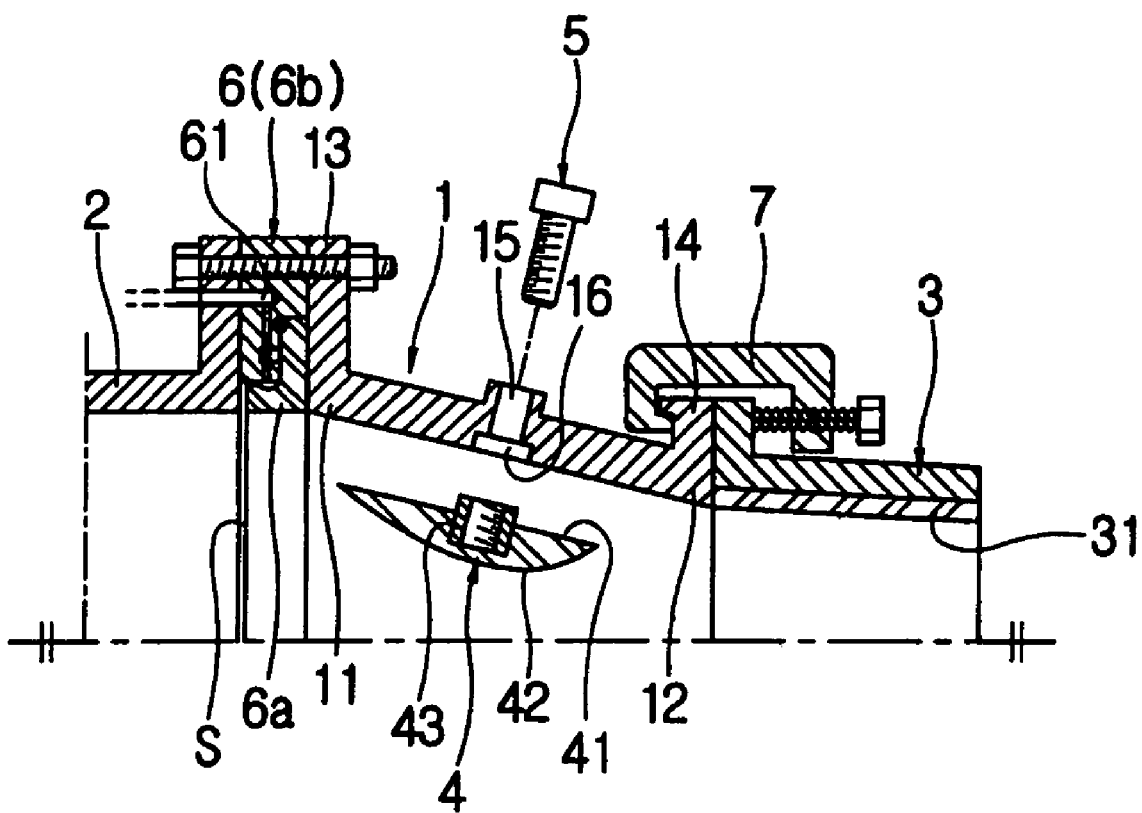
FIG. 3 is a view illustrating an assembled state of a main mouth and a resistance member of the embodiment of FIG. 1.
Figure 4:
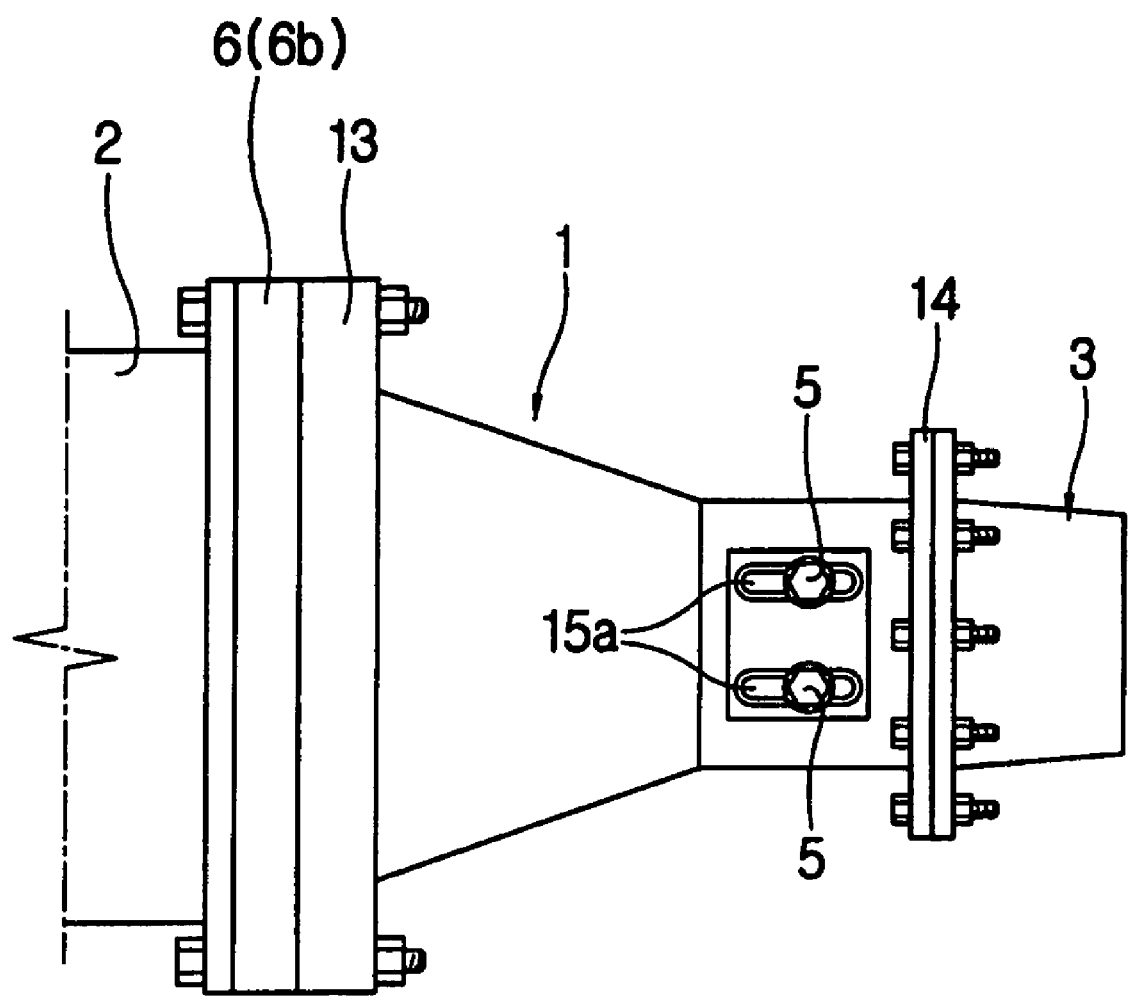
FIG. 4 is a plan view illustrating a main mouth of a brick molding machine according to another embodiment of the present invention.
Figure 5:
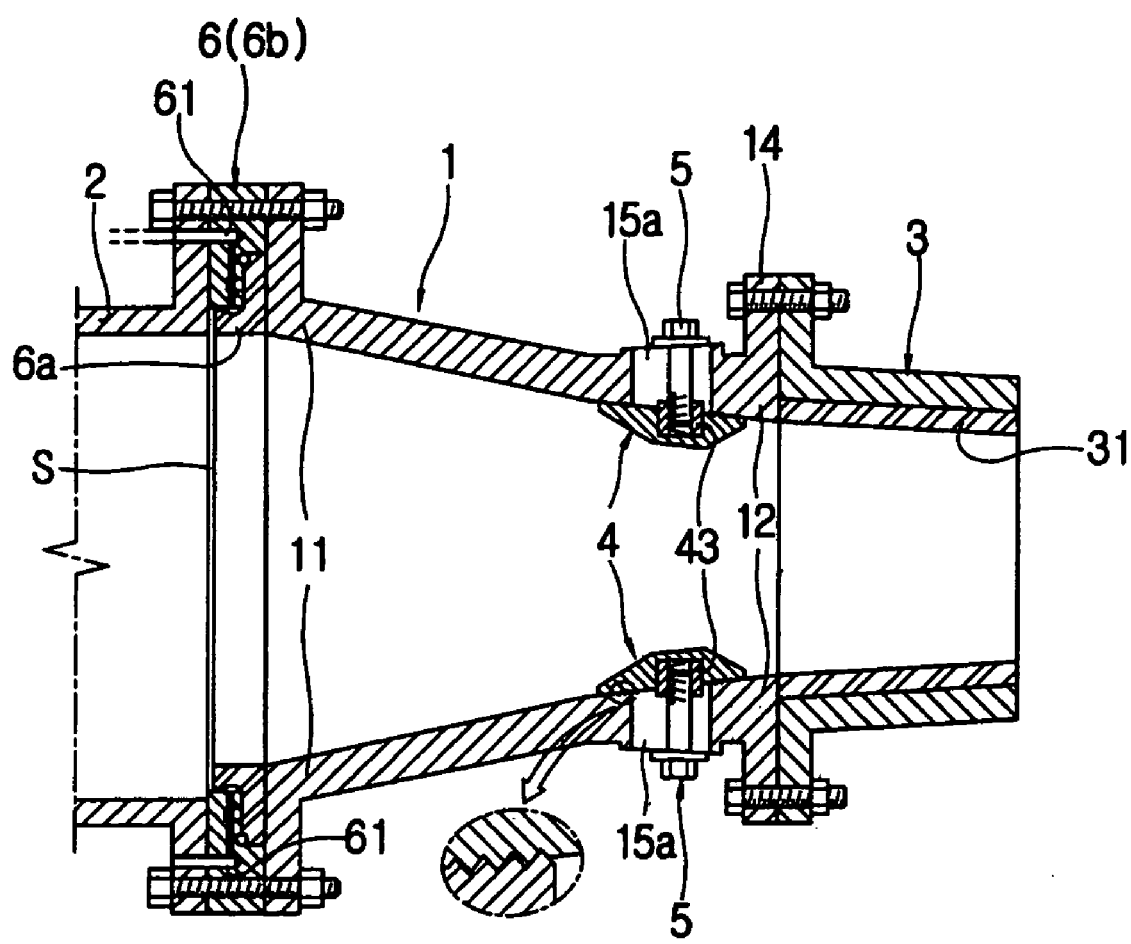
FIG. 5 is a cross sectional view of the embodiment of FIG. 4.
Figure 6:
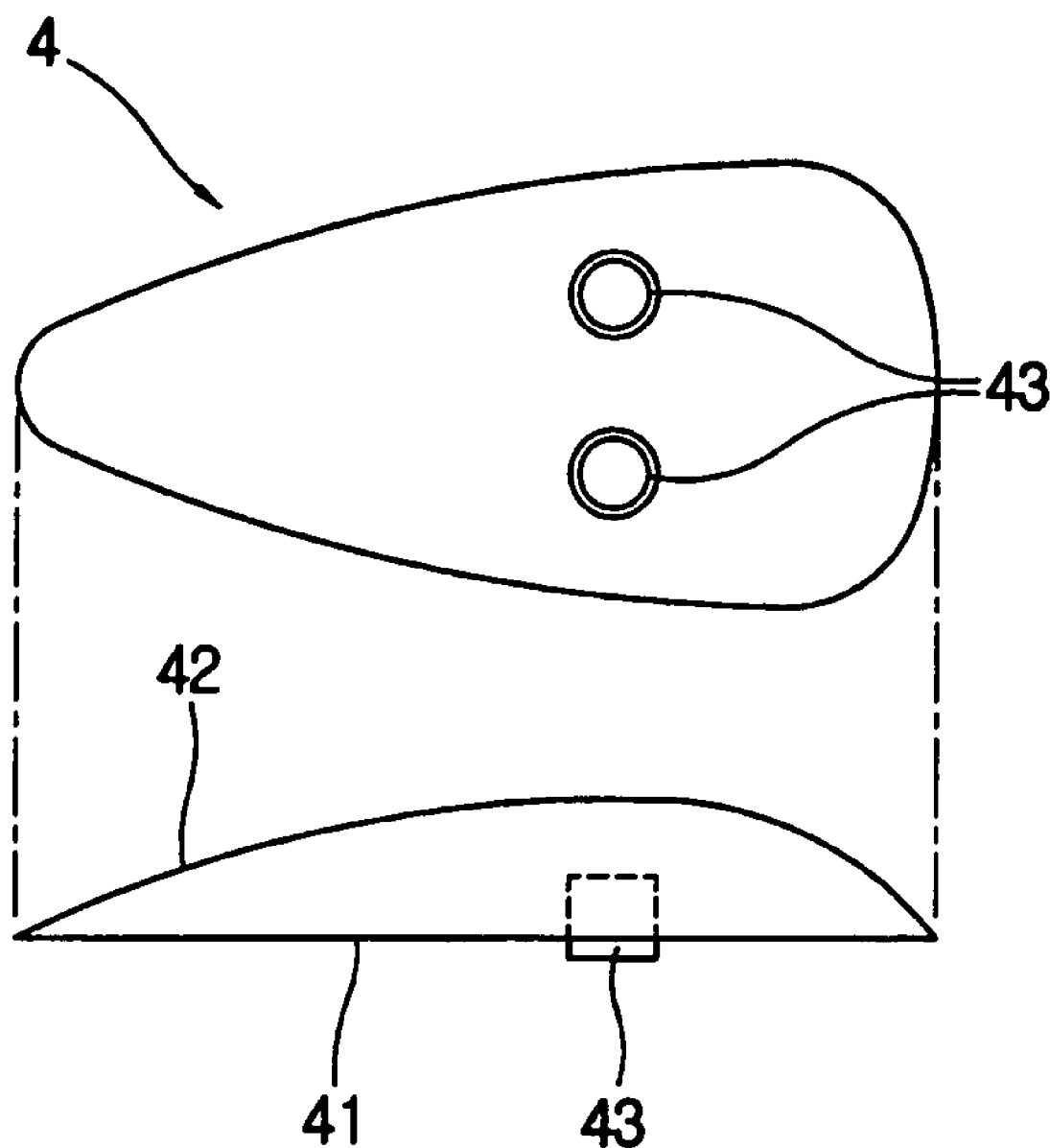
FIGS. 6 and 7 are views illustrating examples of resistance members adapted to the present invention.
Figure 7:
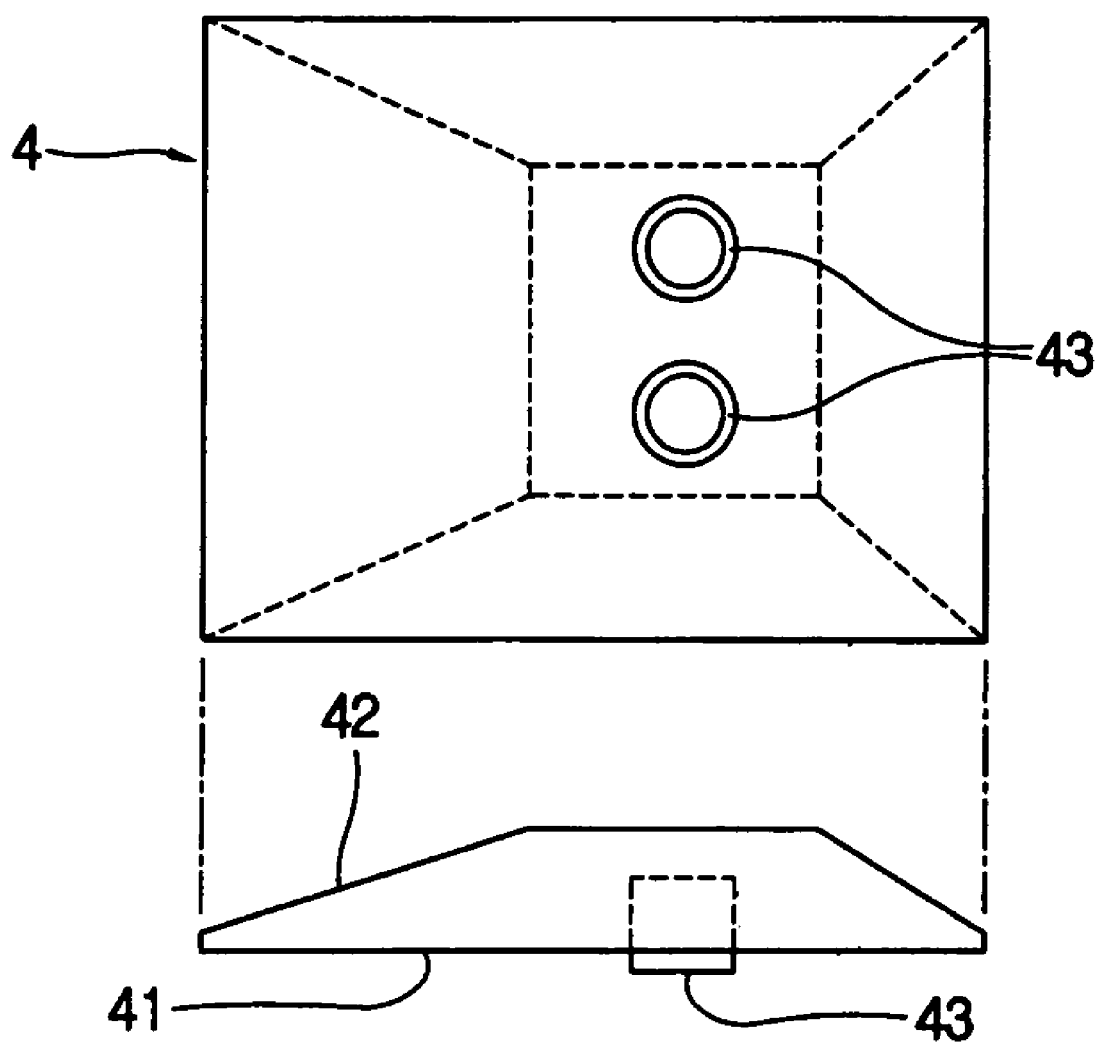
Figure 8:
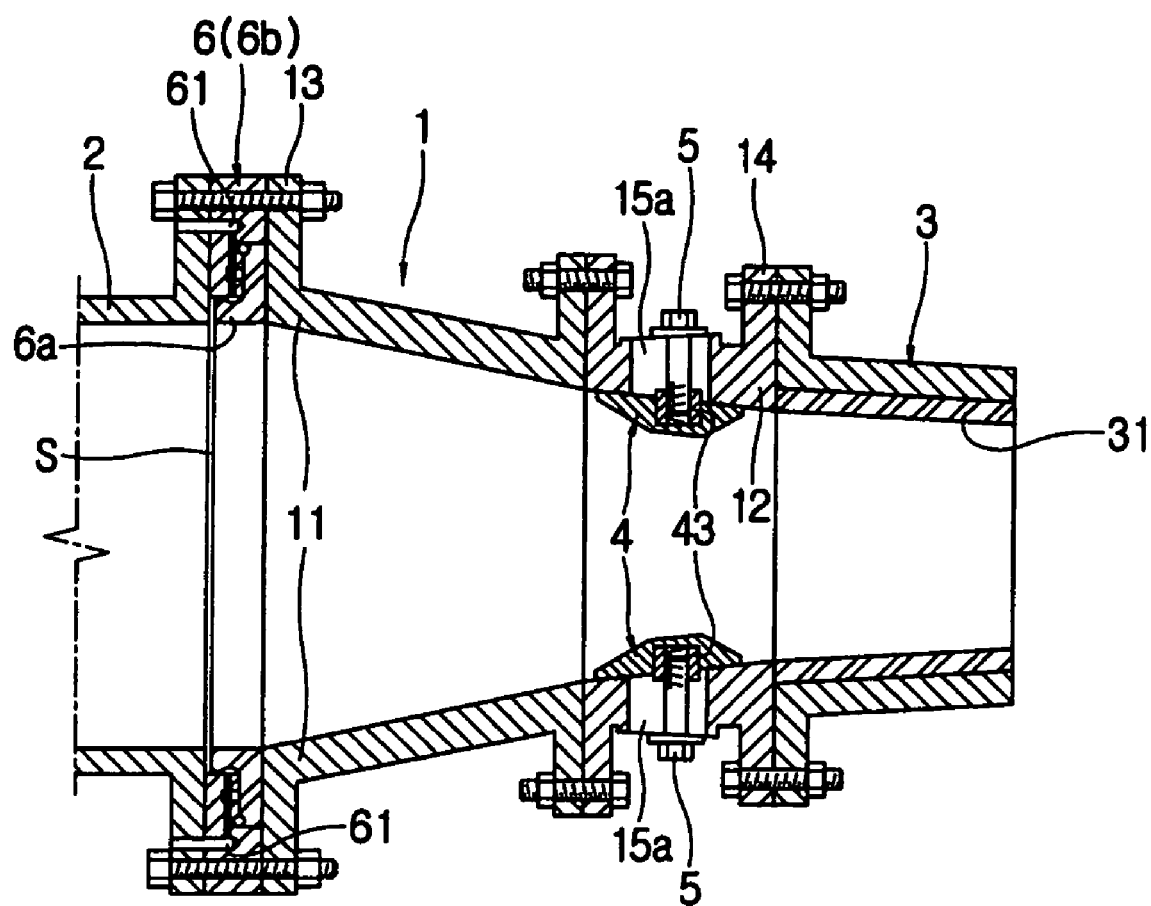
FIG. 8 is a cross sectional view illustrating a main mouth of a brick molding machine according to further another embodiment of the present invention.

FIG. 1 is a plan view illustrating a main mouth of a brick molding machine according to an embodiment of the present invention, FIG. 2 is a cross sectional view of the embodiment of FIG. 1, FIG. 3 is a view illustrating an assembled state of a main mouth and a resistance member of the embodiment of FIG. 1, FIG. 4 is a plan view illustrating a main mouth of a brick molding machine according to another embodiment of the present invention, FIG. 5 is a cross sectional view of the embodiment of FIG. 4, FIGS. 6 and 7 are views illustrating examples of resistance members adapted to the present invention, and FIG. 8 is a cross sectional view illustrating a main mouth of a brick molding machine according to further another embodiment of the present invention.

In the drawings, reference numeral 1 represents a mouth body. The mouth body 1 is made of special steel (for example, Hi-Cr steel) like the conventional art, and engaging flanges 13 and 14 are installed at inlet part 11 and an outlet part 12, respectively, for an engagement with a pressing unit 2 and a mold 3 of a brick molding machine.

The engaging flange 12 formed at the inlet part 11 of the mouth body 1 is formed in a circular shape like the flange formed at the pressing unit 2 of the brick molding machine. A front end inner surface of the inlet part 11 has a circular cross section like the inner surface of the pressing unit 2 and has an inner diameter that is getting smaller and smaller in a direction of the outer part 12. The circular shape of the same is changed to a rectangular shape at a rear end of the outlet part 12. Namely, it has the same rectangular cross section as the shape of the product (brick, sidewalk brick, tile, etc.) that will be fabricated.

In the present invention, a resistance member 4 is detachably attached at upper and lower inner surfaces and left and right inner surfaces of the mouth body 1, respectively, in an assembled type.

As shown in FIGS. 1 and 2, a bolt insertion hole 15 is formed at the mouth body 1 between the inlet part 11 and the outlet part 12. The bolt insertion hole may be formed at all sides of opposite upper and lower surfaces and opposite left and right surfaces of the mouth body 1. However, in the embodiment of the present invention, the bolt insertion hole 15 is formed at upper and lower surfaces. The bolt insertion hole 15 is formed at upper and lower surfaces in multiple numbers.

Each outer side of the bolt insertion hole 15 is protruded in an outer direction, and each inner side of the same has an engaging groove 16.

The attaching surface 41 of the resistance member 4 is closely contacted with the upper and lower surfaces of the mouth body 1. For example, in the case that an inner surface of the mouth body is formed in a flat shape, the attaching surface 41 is made flat. In the case that the inner surface of the mouth body is formed in a curved shape, the attaching surface is made flat.

The protrusion surface 42 of the resistance member 4 is protruded in a direction of the center of the mouth body so that a stress is prevented from being formed at the center of the pressing material press-molded by the mold 3 by generating resistance at material moving into the mouth body 1. In addition, the resistance member may be formed in various shapes such as a streamline shape or a rectangular shape as shown in FIGS. 6 and 7. In addition, the protrusion surface 42 is formed in a curved shape like streamline or an inclined surface for an efficient pressing operation with resistance being smoothly applied to the material.

In addition, the resistance member 4 is made of special steel like the mouth body 1. In the case of special steel, since it is impossible to form female threads, a nut member 43 made of metallic material for easier formation of female threads is embedded at the attaching surface 41. An exposed end of the nut member 43 is slightly protruded from the attaching surface 41 and is inserted into the engaging groove 16 formed at the inner surface of the mouth body 1.

The resistance member 4 is thread-engaged with an end of the engaging bolt 5 inserted from an outer side of the mouth body 1 into the bolt insertion hole 15, so that it is fixed at an inner surface of the mouth body 1. At this time, since an exposed end of the nut member 43 is inserted into the engaging groove 16, the resistance member 4 can be stably fixed without any movement with respect to an engaging force of the engaging bolt 5 and a transfer force of the material moving into the inner side of the mouth body 1 by the engaging groove 16.

As shown in FIGS. 4 and 5, the resistance member 4 is assembled near the outlet part 12 of the mouth body 1. In this embodiment of the present invention, a bolt insertion hole 15a is formed in an elongated shape, so that the installation position of the resistance member 4 can be adjusted.

The bolt insertion hole 15a is formed at a surrounding portion of the mouth body 1 with a relatively narrow width so that the engaging bolt 5 is easily inserted and escaped and is formed at the inlet part and outlet part in an elongated shape having a long length so that the engaging bolt 5 can be moved. Therefore, the installation position of the resistance member 4 is adjusted in the directions of the inlet part 11 and the outlet part 12 and is fixed.

The inner surface of the bolt insertion hole 15a has an inner diameter getting smaller and smaller in the direction that the material is transferred and is formed with a certain inclined surface. The outer surface of the same, namely, the outer diameter of the end of the outlet part 12 is larger and getting smaller and smaller in the direction of the outlet part 11. Therefore, the resistance member 4 is fixed in position at the original position overcoming the transfer force of the material without any movement by the head part of the engaging bolt 5 supported by the attaching surface 41 formed at an inner surface of the outlet part 12 and an outer surface of the bolt insertion hole 15a.

As shown in FIG. 5, the protrusions formed at the attaching surface 41 of the resistance member 4 and the inner surface of the bolt insertion hole 15a are engaged with each other, so that the resistance member 4 is stably fixed.

As shown in FIG. 8, the mouth body 1 is separated from the inlet part 11 and the outlet part 12, and then the flange is engaged at the inlet part and the outlet part, respectively, using bolts. The resistance member 4 is assembled at an inner surface of the outlet part 12.

In the above embodiment of FIG. 8, an oil block 6 is provided in order to increase the fluidity of material when fabricating the products using materials having high viscosity and fabricating thin products. At this time, the oil block 6 may be installed between the mouth body 1 and the pressing part 2 of the brick molding machine or between the mouth body 1 and the mold 3. In the present invention, the oil block 6 is preferably installed between the mouth body 1 and the pressing part 2 of the brick molding machine.

The oil block 6 is separated into the inner block 6a and the outer block 6b, and the inner and outer blocks 6a and 6b are assembled.

At this time, since the inner block 6a of the oil block 6 directly contacts with material pressed and transferred from the pressing part 2, it is made of special steel having high strength. In addition, the outer block 6b does not directly contacts with material, and is installed between the engaging flange 13 of the inlet part and the engaging flange of the pressing part 2 of the brick molding machine using bolts. Therefore, the outer block 6b is not fabricated using special steel like the inner block 6a.

A plurality of oil inlet holes 61 are formed at multiple portions (preferably 4 portions) of the outer block 6b in order to supply oil (light oil, etc.). A certain flow path is formed at each oil inlet hole 61 in order to supply oil to the inner block 6a. A certain small gap (S) is formed between the inner block 6a and the pressing part 2, so that the oil inputted into the oil inlet hole 61 is uniformly supplied to the whole portions of the inner surfaces of the inner block 6a.

The engaging flange 13 formed at the inlet part 11 of the mouth body 1 is engaged at the flange formed at the pressing part 2 of the brick molding machine using bolts in a state that the oil block 6 is installed. In the case of the engaging flange 14 formed at the outlet part 12 of the mouth body 1, as shown in FIGS. 1 and 2, the engaging flange 14 is engaged at the flange of the mold 3 using a plurality of engaging clamps 7. As shown in FIGS. 4 and 5, the engaging flange 14 of the outlet part 12 and the flange of the mold 3 are engaged using bolts.

A linear made of special steel is engaged at an inner surface of the mold 3 like the conventional art.

Figure 9:
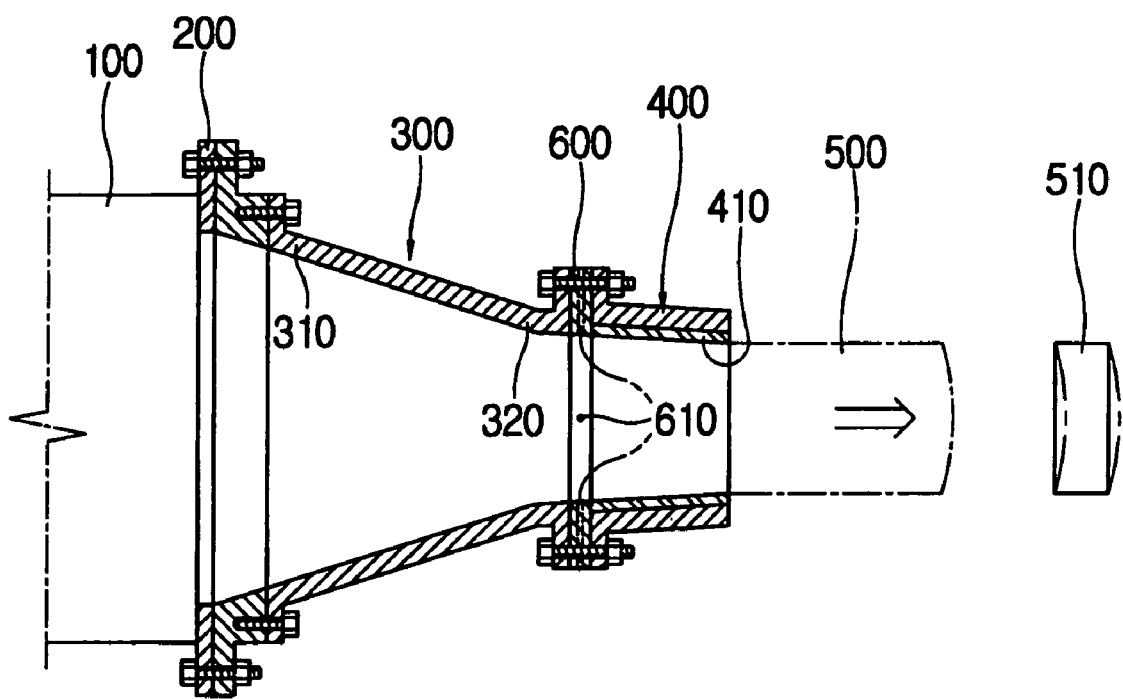
FIGS. 9 and 10 are views of the conventional arts.
Figure 10:
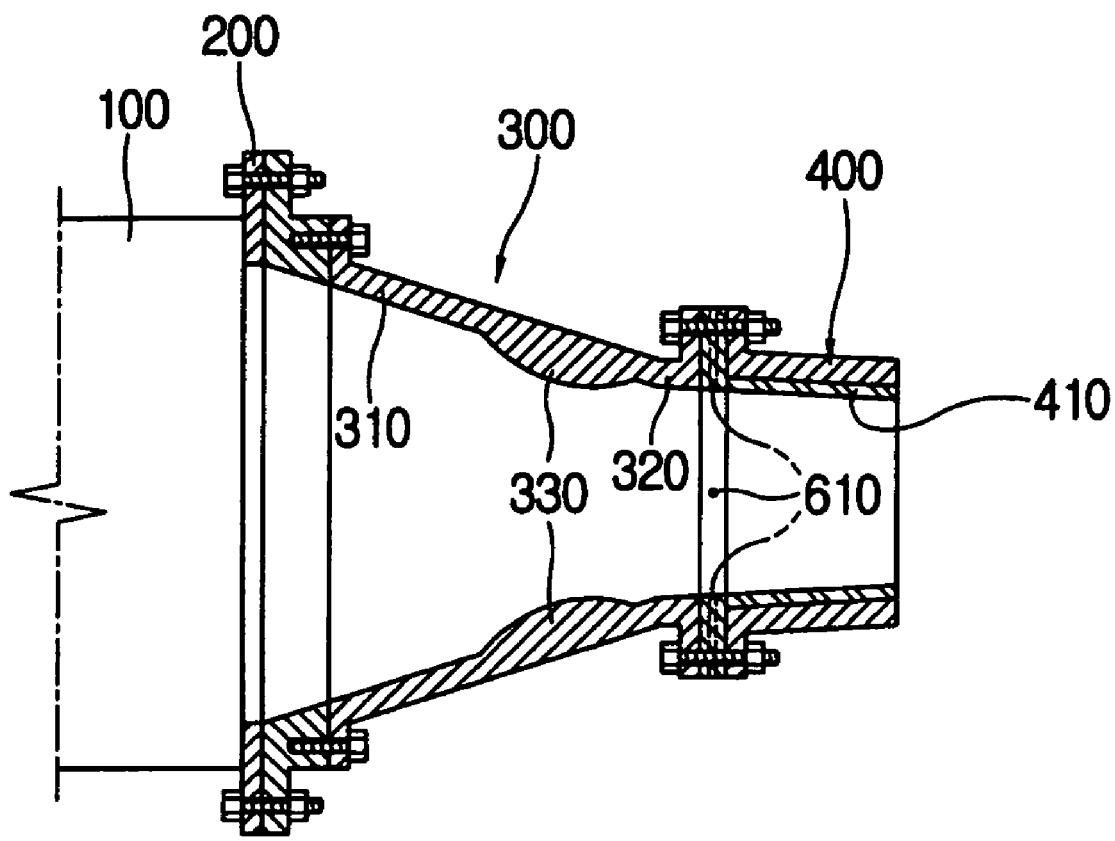

In the present invention, the resistance member 4 installed at an inner surface of the mouth body 1 provides certain resistance to the material that is outputted from the pressing part 2 and moves into the inlet part 11 like the resistance protrusion of the conventional art FIG. 9, so that stress is not formed at the center of the pressing material pressed into the mold 3. At this time, since the resistance member 4 is used to provide resistance to the material pressed and transferred, the resistance member 4 greatly contacts with material as compared to the inner surface of the mouth body 1, so that it is worn out fast.

As the resistance member 4 gets worn out more and more due to the friction with material, when it is supposed to be exchanged, the engaging bolt 5 is loosed and separated, so that a new resistance member is assembled. Therefore, in the present invention, it is possible to significantly extend the life span of the mouth body 1 by exchanging only the resistance member 4 without exchanging the whole body of expensive mouth body.

As shown in FIGS. 4 and 5, it is possible to adjust the installation position of the resistance member 4 installed at the mouth body 1 in assembled state, so that the resistance member 4 can be installed the portion where stress does not occur at the center of the pressing material passing through the mold. In addition, since it is possible to adjust the installation position of the resistance member 4 based on the kind of the material, a good quality product having no barrel-shaped protrusion can be fabricated without providing oil when fabricating the product having a thickness less than 8 mm.

In addition, the oil block 6 installed between the pressing part 2 of the brick molding machine and the inlet part 11 of the mouth body 1 is formed of the inner block 6a and the outer block 6b in assembled type. Therefore, when the inner block 6a contacting with material transferred from the pressing unit 2 is worn out by the friction, the mouth body 1 is separated from the pressing unit 2, and the oil block 6 is disassembled, so that the worn-out inner block 6a is separated from the outer block 6b and is exchanged with a new one. Therefore, the outer block 6b is semi-permanently used.

As described above, in the present invention, the resistance member is detachably assembled at an inner surface of the main mouth installed at the pressing unit of the brick molding machine. When the resistance is worn out, only the worn-out resistance member is exchanged with a new one without exchanging the whole body of the main mouth like the conventional art. In addition, the installation position of the resistance member installed at an inner surface of the main mouth can be adjusted, so that it is possible to install the resistance member at a portion where stress does not occur at the center of the pressing material. In addition, when fabricating the product having a thin thickness (less than 80 mm), it is possible to adjust the installation position of the resistance member. Therefore, it is possible to fabricate a good quality product without using oil. The oil block installed at the main mouth is divided into inner and outer blocks that are engaged in an assembled type. When the inner block contacting with the material is worn out, only the inner block is separated and exchanged without exchanging the whole body of the oil block. Therefore, the outer block can be semi-permanently used. Oil can be uniformly applied to the whole portions of the inner surface of the inner block for thereby significantly decreasing the consumption of oil and decreasing the drying time of product. In the present invention, it is possible to decrease maintenance cost of brick molding machine that fabricates bricks, sidewalk bricks, and tiles. The fabrication cost of the product can be decreased.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a main mouth installed between a pressing unit of a brick molding machine and a mold in an assembled structure, a main mouth of a brick molding machine, comprising:
   a bolt insertion hole that passes through two opposing sides among upper and lower sides and left and right sides between inlet and outlet parts of a mouth body;
   a resistance member that includes an attaching surface attached to an inner surface of the mouth body having the bolt insertion hole therein, and a resistance surface protruded in a direction of an inner surface of the mouth body;
   a nut member embedded in the attaching surface of the resistance member with a part of the same being exposed; and
   an engaging bolt that is inserted from an outer side of the mouth body through the bolt insertion hole and thread-engaged with the nut member embedded in the resistance member for thereby fixing the resistance member to an inner surface of the mouth body.

2. The mouth of claim 1, wherein an engaging groove is formed at an inner circumferential surface of the bolt insertion hole formed at the mouth body, and an end of the nut member embedded in the resistance member is protruded from the attaching surface, and when the resistance member is assembled to an inner side of the mouth body, the resistance member is thread-engaged with an engaging bolt in a state that the protruded end of the nut member is inserted into the engaging groove.

3. The mouth of claim 1, wherein said bolt insertion hole formed at the mouth body has a narrow width determined so that the engaging bolt passes through the same, and the engaging bolt is thread-engaged with the nut member of the resistance member, moving in a direction of the center, and has an elongated hole having a certain long length in a direction of the inlet part and the outlet part.

4. The mouth of claim 1, wherein an oil block is installed between the pressing unit of the brick molding machine and the mouth body with said oil block being divided into inner and outer blocks.

5. The mouth of claim 1, wherein said mouth body is engaged in an assembled type in a state that the inlet and outlet parts are separately fabricated, so that the resistance member is installed at the outlet part in an assembled type.

\* \* \* \* \*